June 16, 1931.  J. C. SIEGLE  1,810,091
JOINT FOR IRON AND STEEL PIPES AND TUBES
Filed Sept. 5, 1928
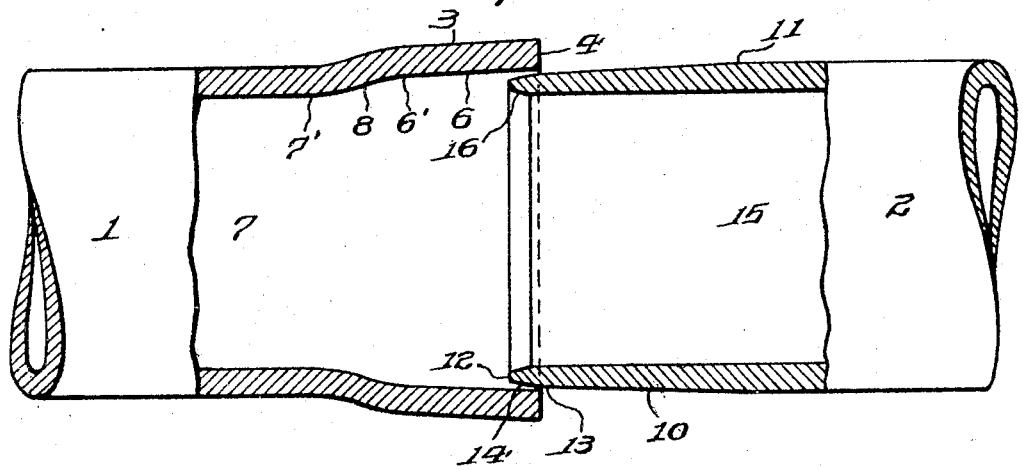
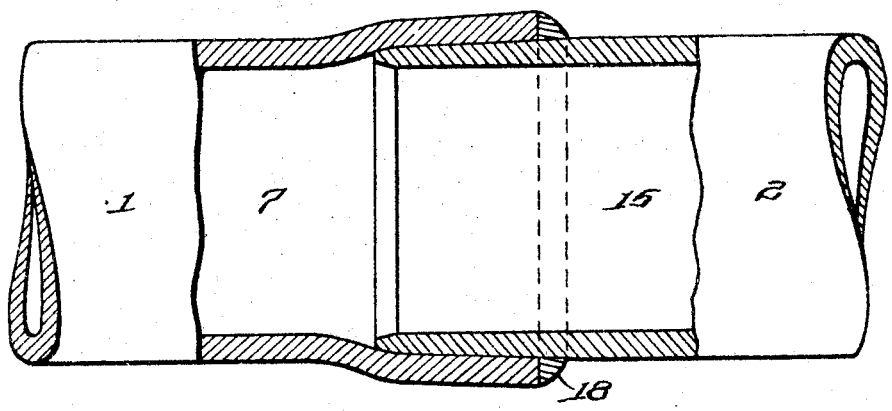
INVENTOR
Jacob C. Siegle.
WITNESS
F. J. Hartman.
BY
ATTORNEYS Patented June 16, 1931

1,810,091

UNITED STATES PATENT OFFICE

JACOB C. SIEGLE, OF YOUNGSTOWN, OHIO, ASSIGNOR TO THE YOUNGSTOWN SHEET AND TUBE COMPANY, OF YOUNGSTOWN, OHIO, A CORPORATION OF OHIO

JOINT FOR IRON AND STEEL PIPES AND TUBES

Application filed September 5, 1928. Serial No. 304,095.

The present invention more particularly relates to joints suitable for uniting the iron or steel pipe sections in pipe lines for conveying oil and gas and which therefore must be of such character as to prevent leakage of the contents of the line which is frequently under considerable pressure and must also be capable of withstanding the corrosive action of the sulphur and other constituents of the fluids passing through the line. Pipe joints intended for this class of work must also fulfil certain other requirements, among which may be mentioned facility of assembly in the field to thereby enable the pipe sections to be readily brought together and the joints therebetween completed economically and rapidly even though during shipment and handling of the pipe sections before they are assembled to form the line the ends thereof may have been slightly burred or otherwise deformed. Additionally, because of the highly competitive conditions in the pipe industry it is necessary that the cooperative portions of the pipe sections entering into the formation of the joint, whatever may be its character, must be capable of being produced during the manufacture of the pipe without material enhancement of the cost of the latter.

The present invention therefore has for its primary object the provision of a pipe joint which is capable of satisfactorily meeting the conditions to which I have referred and which is therefore eminently suitable for use for connecting the pipe sections of oil and gas pipe lines or the like and for which ferrous, as distinguished from non-ferrous, pipes are almost wholly employed.

A further object of the invention is to provide a pipe joint of such character that the cooperative ends of the pipe sections are in intimate contact when the joint is assembled throughout a relatively large area so that after the joint has been in use for a certain length of time the contacting surfaces rust together and thus materially contribute toward making the joint leak-proof as well as enhancing its ultimate strength with the result that under ordinary conditions of use in pipe lines and the like the joint will remain satisfactorily operative even though the weld by which the sections are connected as hereinafter described partially fails for some reason.

A still further object of the invention is to provide a pipe joint in which the cooperating portions of the pipe sections may be brought into intimate contact through a relatively large area by the exercise of a relatively small amount of endwise pressure for a relatively short period only, thereby obviating the necessity of employing a great amount of force to telescope the sections in the formation of the joint as in those classes of joints in which the cooperating surfaces of the sections are cylindrical and designed to snugly fit one within the other.

A still further object of the invention is to provide a pipe joint of such character that when the pipe sections are brought together in longitudinal alignment and disposed in substantially horizontal position with their cooperating surfaces in contact with each other as when on the surface of the ground or in a trench, the pipe sections will tend to maintain their assembled relation without material longitudinal separation during the subsequent step of welding the sections together with the result that it is ordinarily unnecessary for the workmen to hold the sections in assembled relation during and until the conclusion of the welding operation.

The invention further contemplates the provision of a pipe joint for ferrous pipe of such character that those portions of the pipe which cooperate when the sections are assembled during the formation of the joint as a whole may be readily and economically manufactured; which does not restrict the size of the passage or conduit through the pipe, and which is so formed as to prevent the entrance of the oil or gas, or of the corrosive or deleterious substances such as sulphur contained therein, between the adjacent surfaces of the joint so as to bring about their gradual erosion.

The invention further includes other objects, advantages and novel features of design, construction and arrangement hereinafter more particularly mentioned or which will be apparent from the following description of a joint constructed in accordance with the principles of the invention and illustrated in the accompanying drawings in which Fig. 1 is a fragmentary central longitudinal section of two adjacent lengths of pipe showing the cooperative ends thereof being brought longitudinally together as a preliminary step in the formation of the joint and Fig. 2 is a similar view of the completed joint. The same numerals are used to designate the same parts in both figures.

Referring now to the drawings, 1 and 2 respectively designate two adjacent lengths or sections of pipe. The section 1 is provided at one end with an enlarged bell, generally designated as 3. The outer end face 4 of the bell is preferably disposed in a plane at right angles to the axis of the pipe and from this face the inner wall or surface of the bell is inwardly tapered toward the axis of the pipe as at 6 for a relatively considerable distance, thus forming a slightly conical surface extending inwardly from the end of the bell. For convenience of illustration the taper of this surface is slightly exaggerated in the drawings but in practice is desirably but reltively slight, 1/8" to the foot or even less being found to give satisfactory results. From the inner end of the tapered surface 6 the inner wall or surface of the bell is gradually constricted so as to finally merge into the cylindrical wall of the passage or conduit 7 through the major portion of the pipe section substantially at 7', with the result that the profile of this portion 8 of the inner surface of the bell and which extends from the point 6' at the inner end of the tapered surface 6 to the point 7' conforms to a gradually sweeping curve, slightly reversed as it approaches the point 7' as best shown in Fig. 1. The exterior surface of the bell part of the pipe section from the face 4 to the point where it merges into the body of the section is substantially parallel to the inner surface whereby that portion of the wall lying approximately between the points 6' and 7' forms a region of substantially the same thickness as the main wall of the section and serves to connect the outer portion of the bell surrounding the tapered surface 6 with the body of the pipe. The bell may be formed by forcing a suitably shaped mandrel into the end of the pipe when the latter is cold or in any other suitable way if preferred; it is desirable, however, whatever be the process employed to form the bell, that the inner surface thereof when finished shall be relatively smooth and free from scale or the like.

That end of the other pipe section 2 which is to be united with the section 1 in the completed joint and which forms the male member of the latter is adapted to intimately cooperate with the surface 6 and a portion of the surface 8 of the bell and is therefore provided on its outer surface with a conical zone 10 which tapers inwardly in conformity with the taper of the surface 6 from a point 11 at a suitable distance from the end face 12 of the pipe to a point 13 more nearly adjacent thereto, the width of this zone measured longitudinally of the pipe being preferably slightly greater than the width of the surface 6 measured from the face 4 to the point 6'. Between the inner end of the conical or tapered zone 10 and the end face 12 of the pipe section 2 the outer surface of the latter is progressively curved inwardly in conformity with the corresponding portion of the surface 8 of the bell, thereby forming a zone 14 adapted to intimately contact with the former when the parts are assembled. The end face 12 of the section 2 may desirably be disposed in a plane substantially normal to the axis of the section and the inner corner formed at the junction of the face 12 and the cylindrical wall of the conduit or passage 15 through the section chamfered off as at 16 so as to avoid the occurrence of a sharp corner at this point.

It will thus be apparent that the curved and tapered end of the section 2 may be readily inserted into the bell of the other section and pushed home therein until the zones 10 and 14 are respectively brought into intimate contact with the surface or zone 6 and outer part of the surface or zone 8 as shown in Fig. 2. By reason of the fact that the taper or inclination of the cooperating surfaces or zones 6 and 10 is relatively slight, the two sections when thus brought together tend, under ordinary conditions and when supported on a horizontal or substantially horizontal surface, to at least temporarily remain in assembled relation which would not be the case were the inclination of said surfaces materially greater; on the other hand since the leading end of the section 2 is of less diameter than the outer end of the bell it is possible to very readily enter the former in the latter when assembling the pipe in the field under normal conditions and even though the corner of the bell at the junction of the face 4 and surface 6 or the corner of the section 2 at the junction of the surface 14 and face 12 have been slightly burred or otherwise deformed in transportation or handling. Additionally, as there is no frictional engagement between the cooperating surfaces of the sections until just before they are brought to final position, the sections do not have to be forced together endwise by the exercise of considerable pressure continuously applied from the moment the end of one section is entered in the other until final position is attained as is the case in those classes of joints where the cooperative surfaces of the two sections are cylindrical throughout their longitudinal extent and designed to snugly telescope one within the other; additionally in that class of joints any slight burring or marring of the end of either section renders it extremely difficult if not impossible to enter one section within the other and thereafter bring them into properly assembled position.

The two pipe sections having thus been brought together in substantial axial alignment and with their cooperative surfaces or zones in intimate contact throughout or substantially throughout their extent, the end face 4 of the bell is welded to the peripheral surface of the section 2 entirely around the latter by any suitable method of autogenous welding, either electric or oxy-acetylene, the latter being usually preferred, the welding metal 18 being deposited in the angle formed between the face 4 and the adjacent surface of the pipe section 2 and serving to firmly unite the two pipe sections together, a substantial part of the welding metal being ordinarily obtained from a welding rod or wire which is melted during the welding operation as will be readily understood by those familiar with the art. As hitherto pointed out it is usually unnecessary during the welding operation to press or hold the pipe sections longitudinally together as the frictional engagement between their cooperative surfaces after the latter have been brought into intimate contact is ordinarily sufficient to maintain them in place until the completion of the weld. This feature is of material advantage in that it decreases the amount of labor requisite for forming the joint.

It will be noted that in the completed joint there is no annular opening or pocket between the adjacent inner and outer peripheral surfaces of the two pipe sections which cooperate in the formation of the joint in which the fluid itself or substances such as sulphur derived therefrom or entrained therewith can collect during the passage of the fluid through the pipe line; the presence of such pockets in certain forms of joints which have hitherto been suggested has been found under practical conditions of use to be objectionable for the reason that sulphur and other ingredients of the fluid in the line have a distinct tendency to collect therein and by their deleterious action on the exposed surfaces including that of the welding metal, itself, ultimately render the joint leaky and in some cases entirely unserviceable. In my improved joint, however, said adjacent and cooperative surfaces are constantly in intimate contact with each other and under ordinary conditions of use within a very short time rust together very firmly, thus enhancing the ultimate strength of the joint and preventing the entrance of any fluid or foreign substances between them. Additionally, because of the relatively large area of contact between the said surfaces, the two pipe sections are constantly and rigidly maintained in substantial axial alignment and the welding metal 18 in large measure relieved from the duty of resisting axial disalignment of the sections. In this respect my improved joint exhibits a distinct practical advantage over those forms of joints hitherto suggested in which the cylindrical end of one pipe section is loosely fitted into a cylindrical bell on the other section and the parts united by welding between the end of the latter and the inserted section, for under these conditions the weld is subjected to the double duty of preventing axial separation of the sections and of preventing axial disalignment thereof with the result that when the sections are not properly supported the enormous leverage exerted thereby upon the weld often results in breakage thereof and consequent leakage at the joint. In my improved joint, on the other hand, any tendency toward axial disalignment is resisted not only by the weld itself but by the interaction of the telescoped and intimately fitted ends of the pipe sections so that resistance of the weld itself to axial disalignment of the pipe sections is supplemented and the possibility of breakage and consequent leakage at the weld correspondingly decreased; moreover, if after a long period of use the weld metal 18 should become porous or disintegrated to some extent, the "rust joint" which by this time has been formed between the initially substantially scale-free interfitting surfaces of the sections is effective to reduce the possibility of leakage to a minimum.

In certain forms of bell and spigot joints which have heretofore been proposed, the inner end of the bell has been connected to the main cylindrical portion of the pipe by an annular flange directed very sharply angularly outwardly from the latter to meet the bell and thus lying almost normal to the axis of the pipe. The relatively sharp bends thus necessarily occurring at the junctions of the flange with the bell and with the main portion of the pipe are objectionable as they render the joint extremely weak at these points where the fibres of the metal are necessarily subjected to a very sharp change in direction. It will however be observed that in accordance with my improved construction there are no such sharp angles or changes in direction with resulting weakness, that portion of the wall connecting the bell proper with the major portion of the pipe being at all points fully as strong as the latter, and that in consequence the pipe line as a whole is therefore fully as strong in the vicinity of the joints as at any other point in its length. Moreover, in my improved joint, there is no opportunity for any of the welding metal 18 to find its way to the interior of the pipe or joint during the welding operation and thereby obstruct or restrict the passage through the pipe, nor is there any constriction of the latter either in the vicinity of the joint or elsewhere throughout its length.

It will of course be appreciated that while in the drawing I have only shown the adjacent ends of the two pipe sections cooperating in the formation of one of my improved joints, in practice each pipe section is provided at one end with a bell 3 and at the other with the curved and tapered zones 14 and 10 and may thus be united in accordance with my invention with other similar and adjacent sections to form a pipe line of any desired length.

While I have herein described and illustrated with considerable particularity a form of joint embodying the principles of my invention, it will of course be understood that minor changes may be made in details of construction and in the length and taper of the cooperating surfaces on the pipe sections without departing from the spirit and scope of the invention as defined by the appended claims.

Having thus described my invention, I claim and desire to protect by Letters Patent of the United States:

1. In a pipe joint, the combination of a pipe section having an integral bell at one end providing a tapered conical surface of substantial width extending inwardly from its outer face and a curved surface extending from the inner end of the tapered surface to the cylindrical bore of the pipe, a second section having a conical inwardly tapered zone of substantial width on its outer surface spaced from one end of the section and corresponding in taper to the conical surface of the bell and a zone between the end of the tapered zone and the end of the section curved in correspondence with the curved surface of the bell, said tapered and curved zones of the second pipe section being disposed in intimate contact with the corresponding surfaces of the bell throughout a substantial area, and welding material disposed between the outer face of the bell and the peripheral surface of the second section and serving to unite the sections.

2. In a pipe joint, a pipe section having an exterior inwardly tapered zone of substantial width spaced from one of its ends and an inwardly curved and relatively shorter zone extending therefrom to the adjacent end of the section, a second pipe section having an integral bell at one end internally inwardly tapered from its extremity for a substantial distance and inwardly curved beyond said taper for a relatively shorter distance in correspondence with the taper and curvature of the first section and thus adapted to receive the end of the first section when the latter is inserted in the bell and form intimate contact therewith substantially throughout the tapered and curved zones thereof, and welding material disposed in the angle formed between the end of the bell and the peripheral surface of the first section and serving to permanently unite said sections.

3. In a pipe joint, the combination of a ferrous pipe section having a passage of constant diameter throughout the major portion of its length and a bell of greater diameter than said passage at one end integrally connected with the major portion of the section by a relatively short region of increasing diameter, the inner surface of the bell being tapered from its outer extremity toward said region, a second pipe section provided adjacent one end with a relatively short zone curved outwardly from the end of the section in correspondence with the curvature of the inner surface of said connecting region and a zone of substantially greater width interposed between said curved surface and the cylindrical outer surface of the major portion of the pipe section and tapered outwardly in correspondence with the taper of the bell, the end of the second section being seated in the bell with its curved and tapered surfaces in intimate contact with the corresponding surfaces of the latter, and an annulus of welding material disposed in the angle formed between the end face of the bell and the adjacent surface of the second section and serving to unite said sections.

In witness whereof, I have hereunto set my hand this 1st day of September, 1928.

JACOB C. SIEGLE.